(12) United States Patent
Iwata et al.

(10) Patent No.: US 6,428,699 B1
(45) Date of Patent: Aug. 6, 2002

(54) OIL STRAINER

(75) Inventors: Yoshifumi Iwata, Kure; Yoshihiro Takemoto; Yasumi Mototani, both of Higashihiroshima, all of (JP)

(73) Assignee: G P Daikyo Corporation, Hiroshima (JP)

( * ) Notice: Subject to any disclaimer, the term of this patent is extended or adjusted under 35 U.S.C. 154(b) by 0 days.

(21) Appl. No.: 09/483,136

(22) Filed: Jan. 13, 2000

(30) Foreign Application Priority Data

Jan. 25, 1999 (JP) .......................................... 11-016142

(51) Int. Cl.⁷ ........................ B01D 29/05; B01D 35/027
(52) U.S. Cl. ........................ 210/249; 210/445; 210/168; 210/172; 210/416.5
(58) Field of Search .................... 210/168, 249, 210/416.4, 416.5, 445, 453, 455, 459, 462, 435, 472; 123/196 A; 403/408.1

(56) References Cited

U.S. PATENT DOCUMENTS 3,929,648 A * 12/1975 Cuthbert ..................... 210/445
4,264,443 A * 4/1981 Anderson et al. ........... 210/168
4,472,861 A * 9/1984 Joseph et al. ................. 24/289
5,130,014 A * 7/1992 Volz ............................ 210/130

FOREIGN PATENT DOCUMENTS

| JP | 3-119514 | 12/1991 |
| JP | 8-121138 | 5/1996 |

\* cited by examiner

*Primary Examiner*—Matthew O. Savage
(74) *Attorney, Agent, or Firm*—George W. Neuner, Esq.; Edwards & Angell LLP (57) ABSTRACT

An oil strainer comprises upper and lower partial bodies, made of synthetic resin, joined together to form a roughly tube-shaped strainer main body, the interior of which is provided with a filter. The oil strainer has a flange section for attachment with bolts, and the flange section is provided with at least one bolt hole which passes through the interior of the roughly tube-shaped strainer main body. With this structure, it is possible to provide an oil strainer which can be installed on a small installation surface, which is able to reduce resin fatigue, and which can prevent impairment of the seal due to loosening of installation members.

7 Claims, 10 Drawing Sheets

OIL STRAINER

FIELD OF THE INVENTION

The present invention relates to an oil strainer for filtering engine oil used as lubricant in an automobile engine, and to a method of manufacturing such an oil strainer.

BACKGROUND OF THE INVENTION

An automobile engine is provided with an oil strainer, in which engine oil is cleaned by passing through a filter.

Figure 9A:
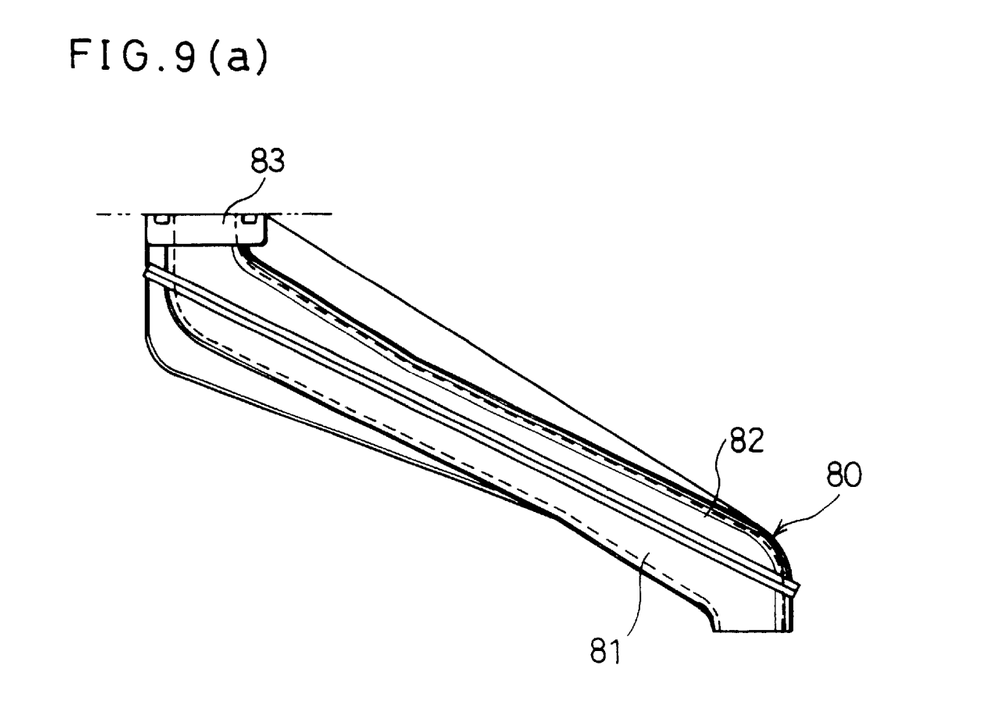
FIGS. 9(a) and 9(b) show a conventional oil strainer, FIG. 9(a) being a cross-sectional view and FIG. 9(b) a plan view thereof.
Figure 9B:
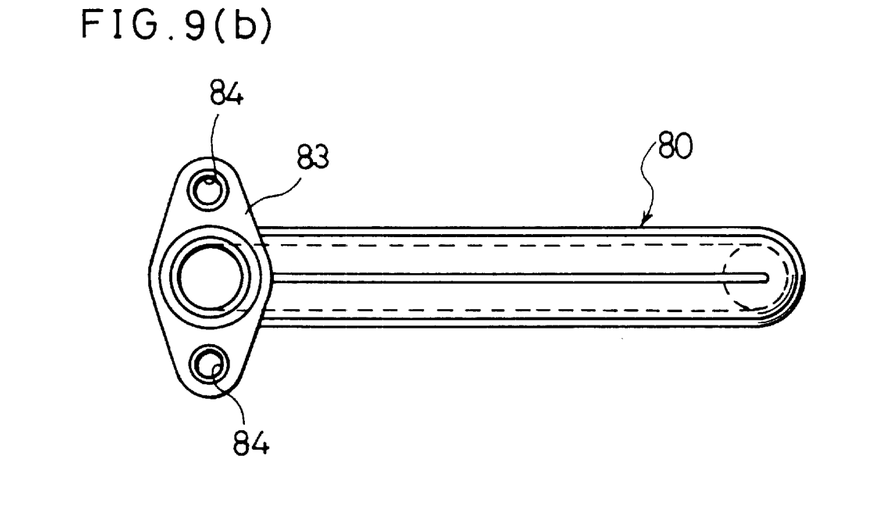

Conventional oil strainers are disclosed in, for example, Japanese Unexamined Utility Model Publication No. 3-119514/1991 (Jitsukaihei 3-119514, published on Dec. 10, 1991) and Japanese Unexamined Patent Publication No. 8-121138/1996 (Tokukaihei 8-121138, published on May 14, 1996). In such conventional oil strainers, as shown in FIGS. 9(a) and 9(b), two synthetic resin partial bodies 81 and 82, are joined together to form a roughly tube-shaped strainer main body 80, the interior of which is provided with a filter (not shown) substantially parallel to the surface where the synthetic resin partial bodies 81 and 82 are joined. The strainer main body 80 is provided with an installation flange 83, by means of which the oil strainer is attached to the engine main body (not shown) opposite an oil outlet thereof. By passing bolts through at least two holes 84 provided in the installation flange 83, the strainer main body 80 is attached and fixed to the engine main body. Incidentally, in some cases an oil strainer is attached directly to an oil pump.

Here, the installation flange 83 is provided so as to project to the sides of the roughly tube-shaped strainer main body 80, such that the holes 84 are located along a line perpendicular to the strainer main body 80.

Recently, however, it is difficult to secure sufficient space in the oil pan to install an oil strainer, and reduction of the space devoted to installation members is needed.

However, in the foregoing conventional oil strainer, since the installation flange 83 is provided such that the holes 84 are located to the sides of the roughly tube-shaped strainer main body 80, it is difficult to reduce the space devoted to installation members.

Figure 10:
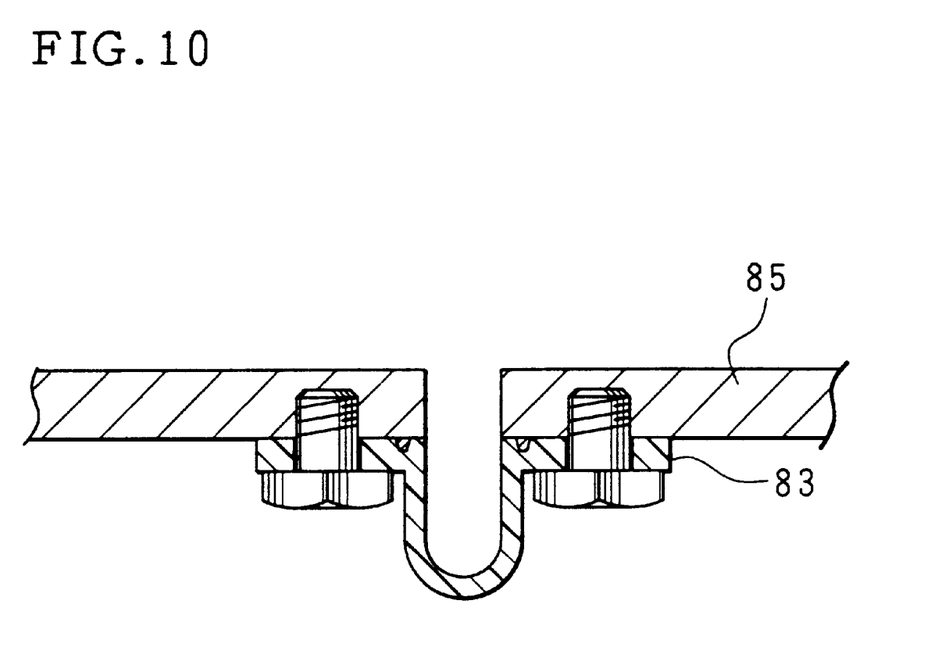
FIG. 10 is a cross-sectional view showing the structure of a flange section of the foregoing conventional oil strainer.

In addition, since, as also shown in FIG. 10, the installation flange 83 is thin, resin fatigue is likely to occur due to vibration while the engine is running.

A further problem with conventional resin oil strainers like the foregoing is that they lack a sufficient structure for preventing loosening of the installation bolts, because it is difficult to design such a structure.

SUMMARY OF THE INVENTION

It is an object of the present invention to provide an oil strainer which can be installed on a small installation surface, which is able to reduce resin fatigue, and which can prevent impairment of the seal due to loosening of installation members, and to provide a method of manufacturing such an oil strainer.

In order to attain the foregoing object, an oil strainer according to the present invention comprises two synthetic resin partial bodies, joined together to form a roughly tube-shaped strainer main body, the interior of which is provided with a filter; and a flange section for attachment with bolts, in which: the flange section is provided with at least one bolt hole which passes through the interior of the roughly tube-shaped strainer main body.

In the fore going oil strainer, the two synthetic resin partial bodies are joined together to form the roughly tube-shaped strainer main body, inside which the filter is provided.

Accordingly, oil flows in through an inlet section of the roughly tube-shaped strainer main body, is filtered by passing through the filter, and flows out of an outlet section of the roughly tube-shaped strainer main body and is supplied to the engine.

The oil strainer according to the present invention has a flange section for attachment with bolts, and the flange section is provided with at least one bolt hole which passes through the interior of the roughly tube-shaped strainer main body.

In other words, the bolt holes of the flange section were conventionally provided so as to project from the sides of the strainer main body, making it difficult to reduce the space devoted to installation members.

However, with the present invention, at least one bolt hole of the flange section is provided so as to pass through the roughly tube-shaped strainer main body. Consequently, at least one bolt hole does not project from the side of the strainer main body, thus contributing to reduction of the space devoted to installation members.

Here, since the strainer main body is roughly tube-shaped, the other bolt hole may be provided in the flange section at the end of the strainer main body, and thus this bolt hole will not project from either side of the strainer main body.

Further, as mentioned above, at least one bolt hole of the flange section is provided so as to pass through the interior of the roughly tube-shaped strainer main body.

This means that the thickness of the flange section is not less than the width of the roughly tube-shaped strainer main body in cross-section.

Accordingly, whereas conventionally the flange section was thin, leading to resin fatigue due to vibration when the engine was running, the flange section in the present invention is thicker, thus reducing such resin fatigue due to vibration when the engine is running.

As a result, it is possible to provide an oil strainer which can be installed on a small installation surface, and which can reduce resin fatigue.

In order to attain the foregoing object, a method of manufacturing an oil strainer according to the present invention is a method of manufacturing an oil strainer comprising two synthetic resin partial bodies joined together to form a roughly tube-shaped strainer main body, the interior of which is provided with a filter, and a flange section for attachment with bolts, in which the flange section is provided with at least one bolt hole which passes through the interior of the roughly tube-shaped strainer main body, and the bolt holes of the flange section are provided with metal guide tubes for guiding and supporting the bolts; said method comprising the steps of: (a) forming each of the synthetic resin partial bodies by injection molding; (b) attaching the filter in the interior of one of the synthetic resin partial bodies; (c) heating and melting surfaces of the synthetic resin partial bodies where they are to be joined; (d) bringing the synthetic resin partial bodies together and joining them to form a roughly tube-shaped shape; (e) a press fitting step, in which the metal guide tubes for guiding the bolts are heated and inserted under pressure into the bolt holes of the flange section; and (f) a pressure fixing step, in which the strainer main body is fixed to the guide tubes under pressure such that the guide tubes protrude from a surface of the bolt holes of the flange section.

In the foregoing method, the steps for manufacturing the oil strainer include (a) forming each of the synthetic resin partial bodies by injection molding; (b) attaching the filter in the interior of one of the synthetic resin partial bodies; (c) heating and melting surfaces of the synthetic resin partial bodies where they are to be joined; (d) bringing the synthetic resin partial bodies together and joining them to form a roughly tube-shaped shape; (e) a press fitting step, in which the metal guide tubes for guiding the bolts are heated and inserted under pressure into the bolt holes of the flange section; and (f) a pressure fixing step, in which the strainer main body is fixed to the guide tubes under pressure such that the guide tubes protrude from a surface of the bolt holes of the flange section.

In other words, the two synthetic resin partial bodies are first formed by injection molding. Then the filter is attached to the interior of one of the synthetic resin partial bodies.

Next, surfaces of the synthetic resin partial bodies where they are to be joined are heated and melted, and the two synthetic resin partial bodies are brought together and joined to form a roughly tube-shaped shape.

Then, in the press fitting step, the metal guide tubes for guiding the bolts are heated and inserted under pressure into the bolt holes of the flange section. Next, in the pressure fixing step, the strainer main body is fixed to the guide tubes under pressure such that the guide tubes protrude from a surface of the bolt holes of the flange section.

With regard to the final positional relationship between the guide tubes and the bolt holes, in order to form a seal, it is preferable if the surface of the flange section facing the engine is on the same plane with the ends of the guide tubes. On the surface of the flange section facing away from the engine, on the other hand, the ends of the guide tubes are on the same plane with the surface, or protrude beyond it. This is to ensure that the guide tubes fully support the bolts.

Further, since a pressure fixing step is used, fixing between the guide tubes and the bolt holes is particularly good when rough finishing (knurling, for example) is performed, and the seal will not be impaired even if the synthetic resin changes over time.

As a result, it is possible to provide a method of manufacturing an oil strainer which can be installed on a small installation surface, which is able to reduce resin fatigue, and which can prevent impairment of the seal due to loosening of installation members.

Additional objects, features, and strengths of the present invention will be made clear by the description below. Further, the advantages of the present invention will be evident from the following explanation in reference to the drawings.

DESCRIPTION OF THE EMBODIMENTS

The following will explain one embodiment of the present invention.

The oil strainer according to the present embodiment is used in the oil system of an automobile engine, and filters circulating oil which has accumulated in an oil pan (not shown) before the oil flows to an oil pump.

As shown in FIGS. 1(a), 1(b), 2(a) and 2(b), an oil strainer according to the present embodiment is made up of a lower partial body 10 and an upper partial body 20 (synthetic resin partial bodies), joined together along a plane defined by joint surfaces 10a and 20a of the respective partial bodies to form a roughly tube-shaped strainer main body 1, the interior of which is provided with a generally planar filter 2 located between the upper and lower partial bodies.

The upper end of the strainer main body 1 is provided with a planar mounting flange section 3, for attaching the strainer main body 1 to an engine 9 (to be discussed below) by means of bolts 8 (also to be discussed below).

The lower and upper partial bodies 10 and 20 are made of a synthetic resin such as nylon, and are formed by injection molding.

The lower end of the lower partial body 10 is provided with a pipe-shaped oil inlet tube section 11 extending downward, the lower end of which is an inlet opening 11a, which is an inlet having, for example, a diagonal cut surface. Further, the upper end of the lower partial body 10 is provided with a lower flange section 12, which makes up part of the flange section 3.

The upper end of the upper partial body 20 is provided with an upper flange section 22, which also makes up part of the flange section 3. An upper surface 23 of the upper flange section 22 is flat, and a lower surface 13 of the lower flange section 12 is also flat, and is parallel to the upper surface 23.

The strainer main body 1 is provided so as to extend downward with a slight incline with respect to the upper surface 23 and the lower surface 13 of the flange section 3.

In the present embodiment, the flange section 3 is provided with two bolt holes 4 and 5, and at least the bolt hole 5 is provided in the shape of a tube passing through the interior of the roughly tube-shaped strainer main body 1. In other words, the bolt hole 5 pierces an upper wall of the upper partial body 20, passes as a tube through the hollow interior of the strainer main body 1, and pierces a lower wall of the lower partial body 10.

However, the bolt hole 5 need not be tube-shaped, and may be structured so as to merely pierce the interior of the strainer main body 1. In other words, provided that a seal is attained by the use of packing, for example, it is sufficient if the upper wall of the upper partial body 20 and the lower wall of the lower partial body are provided with holes on a common axis, as when a hole is drilled all the way through a piece of bamboo.

The bolt hole 4 is provided in the shape of a tube at the end of the strainer main body 1 with respect to the longitudinal axis thereof.

As a result, the flange section 3 does not project from either side of the strainer main body 1.

Figure 1:
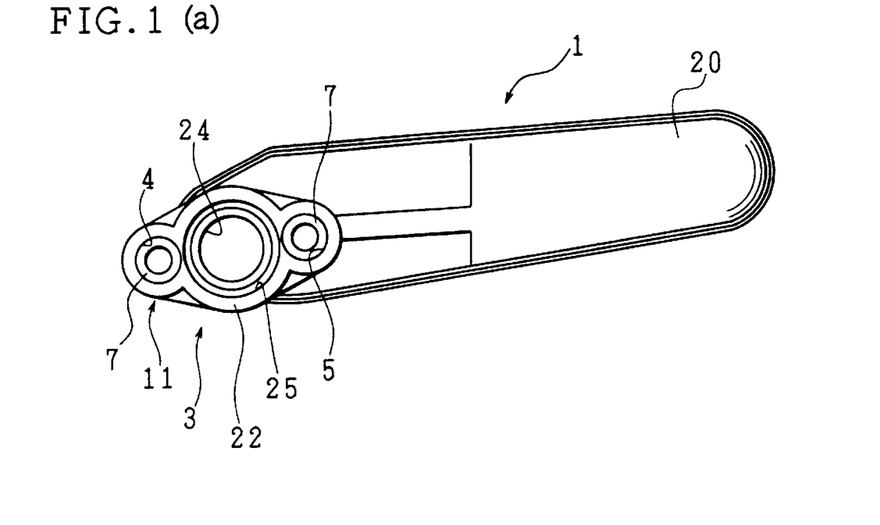
FIGS. 1(a) and 1(b) show one embodiment of an oil strainer according to the present invention, FIG. 1(a) being a plan view and FIG. 1(b) a cross-sectional view thereof.
Figure 2:
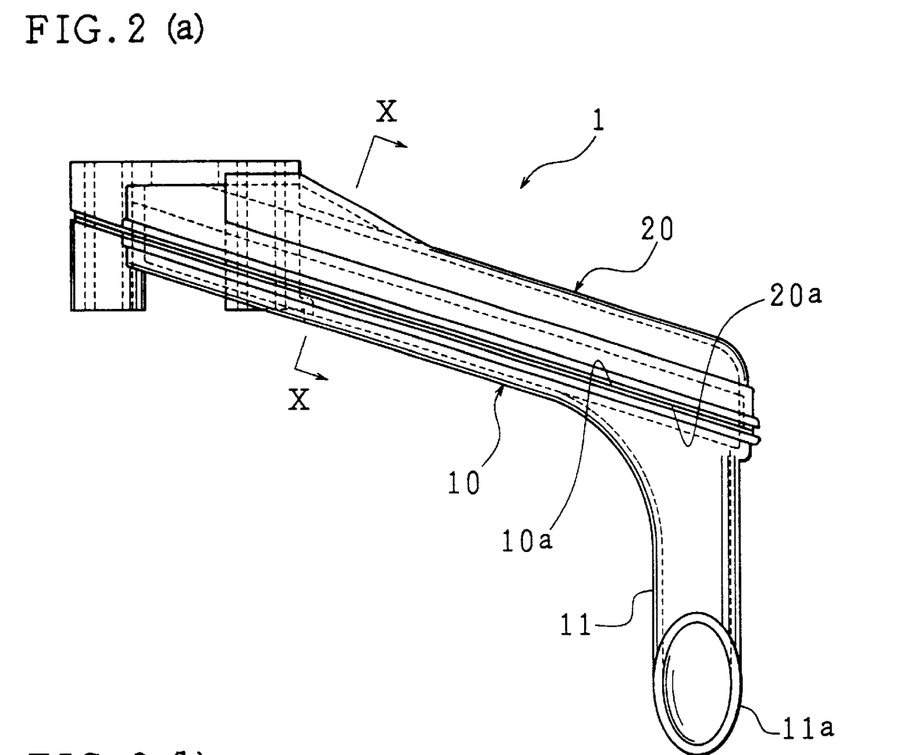
FIG. 2(a) is a front view showing the foregoing oil strainer.
FIG. 2(b) is a view taken along line X—X of FIG. 2(a).

In the center of the flange section 3, between the bolt holes 4 and 5, the upper partial body 20 is provided with an oil outlet section 24 as an outlet.

Further, an O-ring groove 25, for holding an O-ring, is provided in the upper surface 23 of the flange section 3, encircling the oil outlet section 24.

The filter 2 is fixed in the interior of the upper partial body 20 so as to be parallel with a joint surface 20a where the upper partial body 20 is joined to the lower partial body 10.

The filter 2 is also made of synthetic resin, and is formed by injection molding.

Further, the filter 2 is fitted over and attached to the upper partial body 20 so as to entirely cover the interior cavity thereof. Except for a rim section thereof, the filter 2 is made up of a mesh section of a predetermined mesh size.

In addition, the filter 2 is provided with an insertion hole 2a, through which passes the tube-shaped bolt hole 5, and the perimeter of the insertion hole 2a is provided with a raised section (not shown) which fits around the outside of the tube-shaped bolt hole 5, to create a seal between the insertion hole 2a and the tube-shaped bolt hole 5, and for ease of assembly.

In the roughly tube-shaped strainer main body 1 fitted with the filter 2, oil flows into the inlet opening 11a of the oil inlet tube section 11 at the lower end of the lower partial body 10, passes through the filter 2 and into the cavity of the upper partial body 20, and then passes between the outer wall of the tube-shaped bolt hole 5 and the side walls of the upper partial body 20 and flows out through the oil outlet section 24, which extends through the mounting flange section 3.

In the present embodiment, the tube-shaped bolt holes 4 and 5 of the flange section 3 are internally fitted with bushing 7, which are metal guide tubes.

Figure 3:
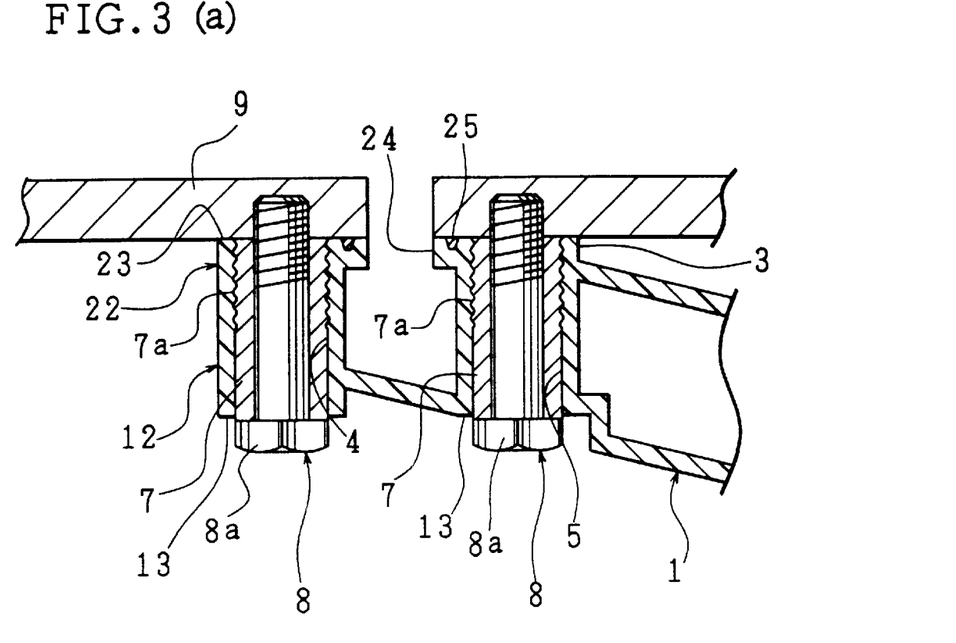
FIGS. 3(a) and 3(b) are cross-sectional views showing the details of bolt holes in a flange section of the foregoing oil strainer, omitting a joint surface and a filter, FIG. 3(a) showing a case in which bushing is used, and FIG. 3(b) showing a case in which bushing is not used.

As shown in FIG. 3(a), the upper part of each bushing 7 is provided with a rough-finished section 7a which is, for example, knurled, by means of which, once the bushing 7 are fitted into the bolt holes 4 and 5, the strainer main body 1 will not move with respect to the bushing 7.

Further, in the present embodiment, as also shown in FIG. 3(a), the upper ends of the bushing 7 are positioned on the same plane with the upper surface 23 of the upper flange section 22, but the lower ends of the bushing 7 are fixed so as to slightly protrude from the lower surface 13 of the lower flange section 12 by, for example, 0.1 mm to 0.3 mm.

By means of this structure, when the bolts 8 are passed through the bushing 7 and attached to the engine 9, bolt heads 8a do not come into contact with the lower surface 13 of the lower flange section 12, but only with the bushing 7. Further, since the flange section 3 is fixed by the rough-finished sections 7a of the bushing 7, even if the flange section 3 shrinks due to change over time, it will not become loose between the bolt heads 8a and the engine 9.

In other words, if, for example, as shown in FIG. 3(b), the bolts 8 are directly inserted into the bolt holes 4 and 5 without using bushing 7, immediately after tightening the bolts 8, the flange section 3 is fixed with the bolt heads 8a in contact with the lower surface 13 of the flange section 3. In this case, if the flange section 3 shrinks due to change over time, it will be freely moveable between the bolt heads 8a and the engine 9. This creates a problem, in that oil will then leak from the space created thereby.

If, however, as discussed above, the bushing 7 are first inserted in the bolt holes 4 and 5, and the bushing 7 maintain a position slightly protruding from the lower surface 13 of the flange section 3, the above situation can be prevented.

In the structure described above, the upper ends of the bushing 7 are positioned on the same plane as the upper surface 23 of the upper flange section 22, but there is no limitation to this structure. The upper ends of the bushing 7 may protrude slightly from the upper surface 23 of the upper flange section 22. In this case, a seal can be achieved between the engine 9 and the upper surface 23 of the upper flange section 22 by adjustment using an O-ring (not shown).

Although the present embodiment explains the case of use of bushing 7, the present invention does not necessarily require this. Other methods which do not require the use of bushing 7 include, for example, use of a spring washer. By this means, although the number of parts is increased, oil leakage can be prevented even if the flange section 3 changes over time.

The following will explain a method of manufacturing the foregoing oil strainer.

First, the lower and upper partial bodies 10 and 20 are formed by injection molding.

Figure 4:
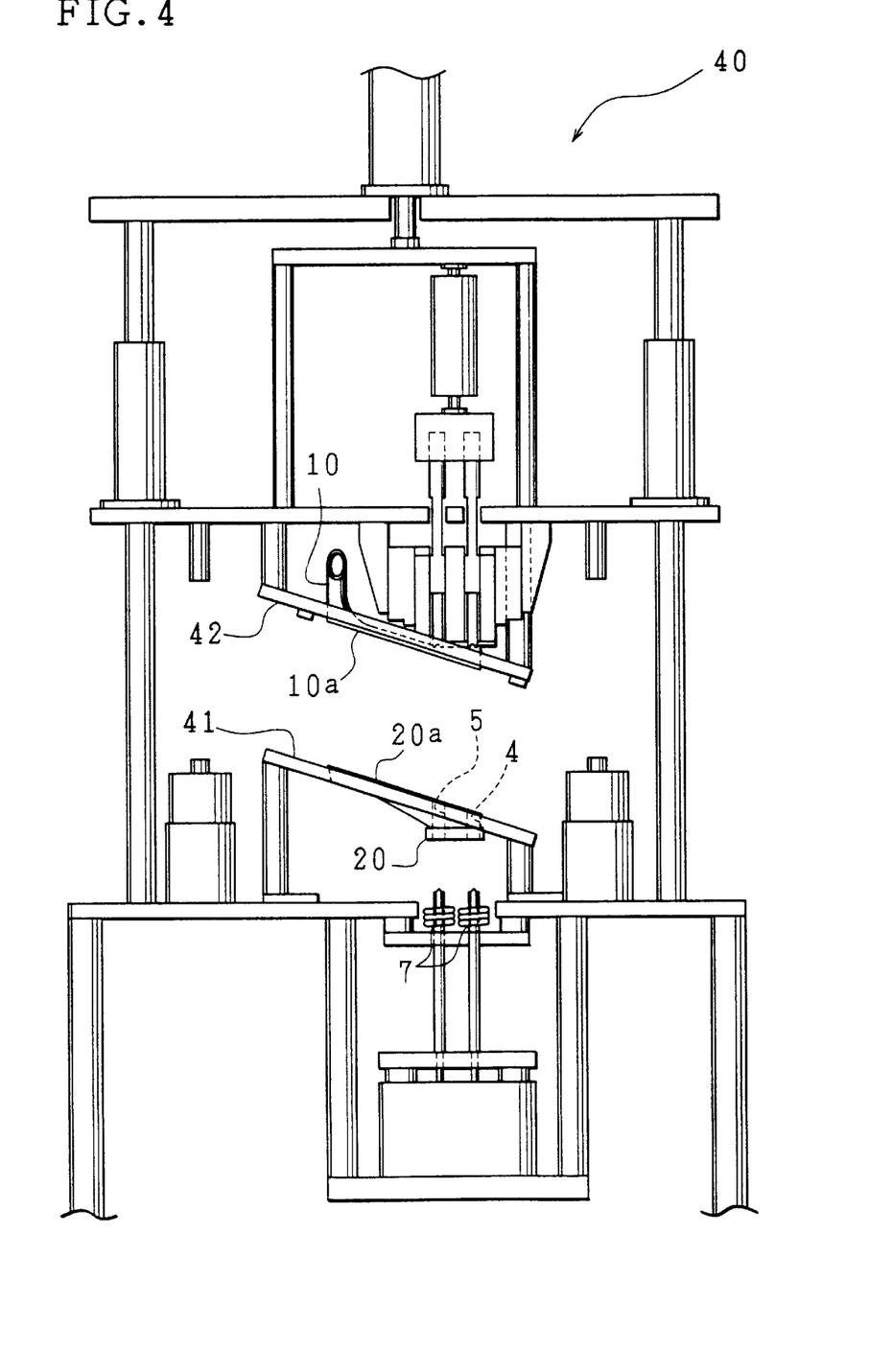
FIG. 4 is an explanatory drawing showing an upper partial body and a lower partial body set in a welding device used in manufacturing an oil strainer.

Next, in order to join together the lower and upper partial bodies 10 and 20 to form the roughly tube-shaped strainer main body 1, a welding device 40, shown in FIG. 4, is used. The welding device 40 automatically welds together the lower and upper partial bodies 10 and 20, and fixes the bushing 7 into the bolt holes 4 and 5.

To explain, in the welding device 40, the upper partial body 20 previously fitted with the filter 2 is fixed upside-down to a lower product fixing table 41, and the lower partial body 10 is fixed upside-down to an upper product fixing table 42. At this time, the upper and lower partial bodies 20 and 10 are positioned so that their respective joint surfaces 20a and 10a are exactly opposite one another in a vertical direction.

Figure 5:
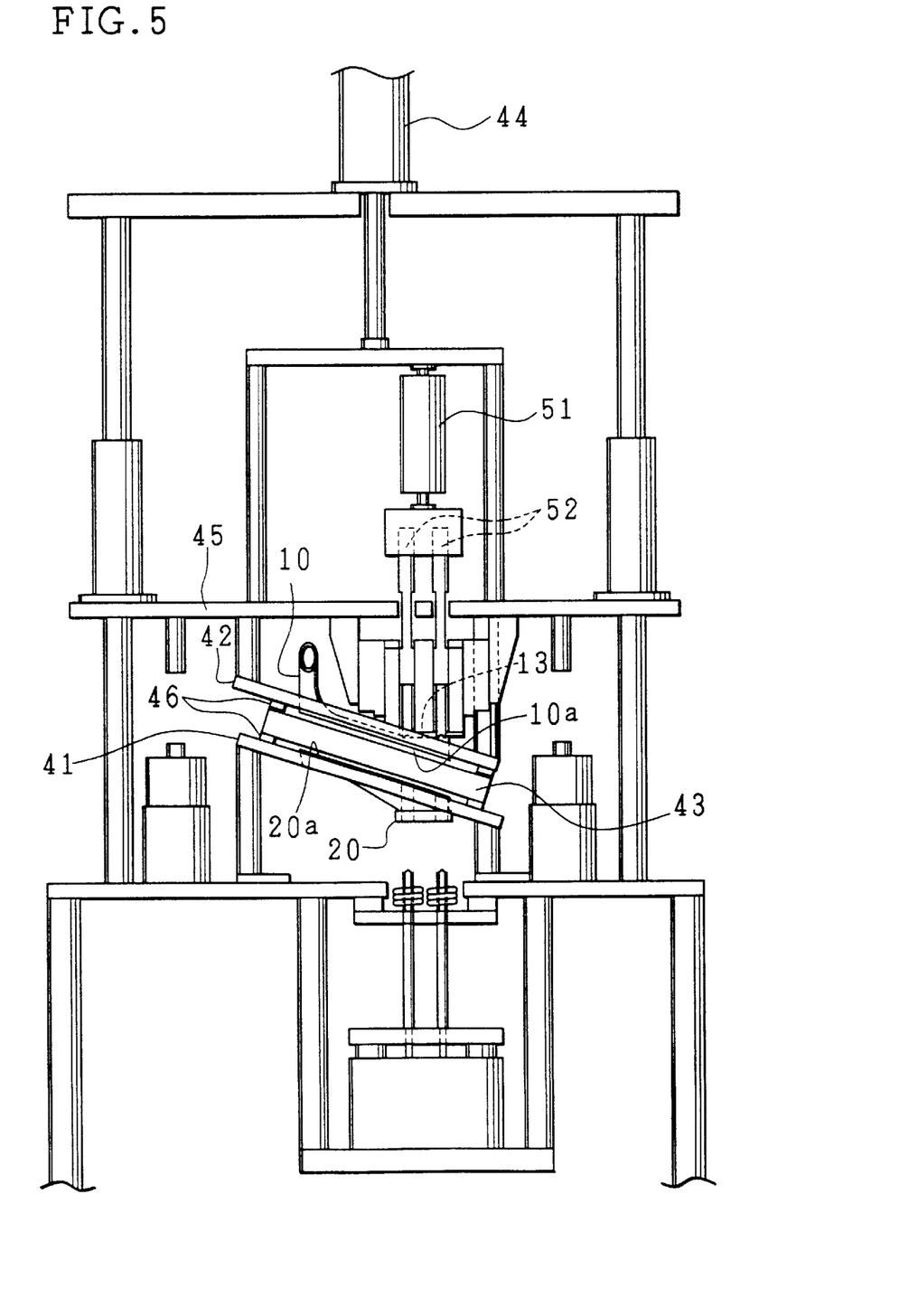
FIG. 5 is an explanatory drawing of a melting step in a method of manufacturing an oil strainer, showing a heating plate placed between the upper and lower partial bodies set in the foregoing welding device.

Next, as shown in FIG. 5, a heating plate 43 is moved from one side to a position between the lower and upper product fixing tables 41 and 42, and the joint surfaces 20a and 10a of the upper and lower partial bodies 20 and 10 are brought in close proximity (a predetermined interval of, for example, 1 mm to 2 mm) with the heating plate 43 from opposite sides thereof. This approaching operation is accomplished by using an upper air cylinder 44 to lower an upper sliding table 45 to a position at the predetermined interval, as determined by positioning stoppers 46.

In this way, the joint surfaces 10a and 20a are melted. The surface temperature of the heating plate 43 at this time is, for example, 500° C. to 650° C., or more preferably 580° C. to 600° C., and the duration of heating is, for example, 10 sec to 30 sec, or more preferably 10 sec to 11 sec.

Incidentally, conditions such as heating conditions, interval of proximity, etc. during heating of the joint surfaces 10a and 20a are set so as not to melt the filter 2.

Figure 6:
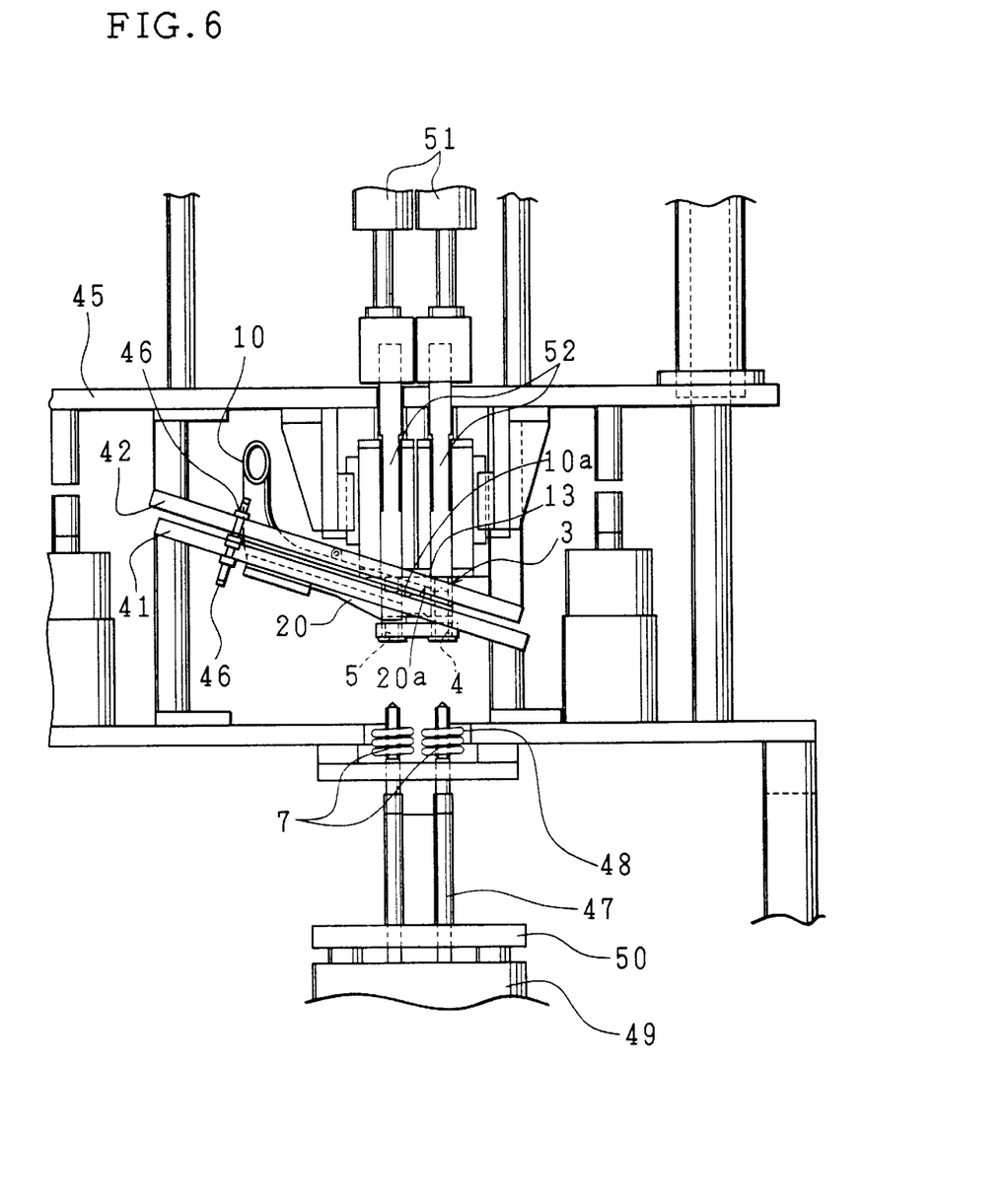
FIG. 6 is an explanatory drawing of a joining step in a method of manufacturing an oil strainer, showing the upper and lower partial bodies brought together and their respective joint surfaces fused.

Next, after removing the heating plate 43 to one side, while the joint surfaces 10a and 20a are still in a melted state, the upper air cylinder 44 further lowers the upper sliding table 45. Simultaneously, pressure-applying air cylinders 51 provided above the upper product fixing table 42 lower two bolt hole positioning pins 52 to the lower surface 13 of the flange section 3, thereby determining the positions of the bolt holes.

In this way, as shown in FIG. 6, the joint surfaces 10a and 20a of the lower and upper partial bodies 10 and 20 are brought into contact and fused together.

Figure 7:
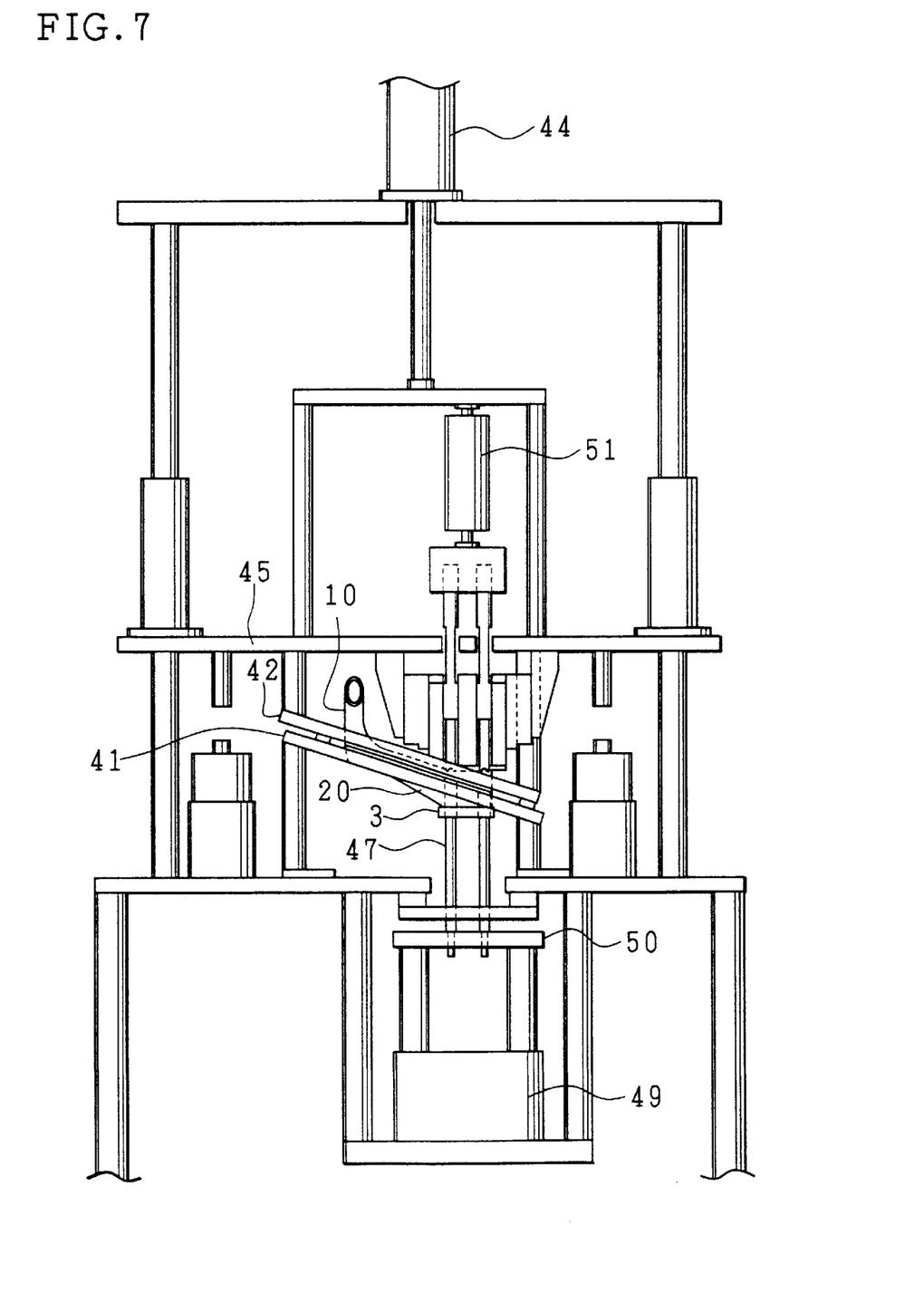
FIG. 7 is an explanatory drawing showing, in a method of manufacturing an oil strainer, a press-fitting step, in which bushing is inserted into each bolt hole of a flange section under heat and pressure, and a pressure fixing step, in which the strainer main body is fixed to the bushing under pressure.

Then the bushing 7, placed on the ends of bushing press-fitting pins 47 located below the bolt holes 4 and 5, are heated by high-frequency heating coils 48 provided so as to surround the bushing 7, and the bushing press-fitting pins 47 are raised by raising a lower sliding table 50 using a lower air cylinder 49. At this time, as discussed above, the bolt hole positioning pins 52 have already been lowered by the pressure-applying cylinders 51 until the bolt hole positioning pins 52 are in contact with the lower surface 13 of the flange section 3. The bushing press-fitting pins 47 press-fit the bushing 7 by pushing against the bolt hole positioning pins 52 via the bushing 7.

The bushing 7 are heated by using the high-frequency heating coils 48 to apply to the bushing 7 high-frequency AC power having, for example, a high-frequency output of 5 kw and an oscillating frequency of 80 kHz to 90 kHz. The temperature to which the bushing 7 are heated at this time is, for example, approximately 250° C. to 300 C., and the duration of heating is, for example, 3 sec to 4 sec.

In this way, as shown in FIG. 7, as the heated bushing 7 are inserted under pressure into the bolt holes 4 and 5 of the flange section 3, they partially melt the inner walls of the bolt holes 4 and 5. In other words, they are pressure-fitted.

Pressure-fitting is continued until the ends of the bushing 7 are even with the upper surface 23 of the upper partial body 20, but on the other side of the flange section 3, the bushing 7 protrude by 0.1 mm to 0.3 mm from the lower surface 13 of the lower partial body 10. Consequently, the flange section 3 is compressed, and the bushing 7 are pressure fixed into the bolt holes 4 and 5. Since the bushing 7 are pressure fixed in this way, and due to the knurling of their upper parts, the bushing 7 have a parting force of approximately 1960N or more.

Duration of a cooling period after press-fitting the bushing 7, during which the members are held motionless, is, for example, 20 sec; holding the members motionless for a period of this approximate duration allows the bushing 7 to cool and to become sufficiently fixed to proceed to the subsequent product removal step.

Figure 8:
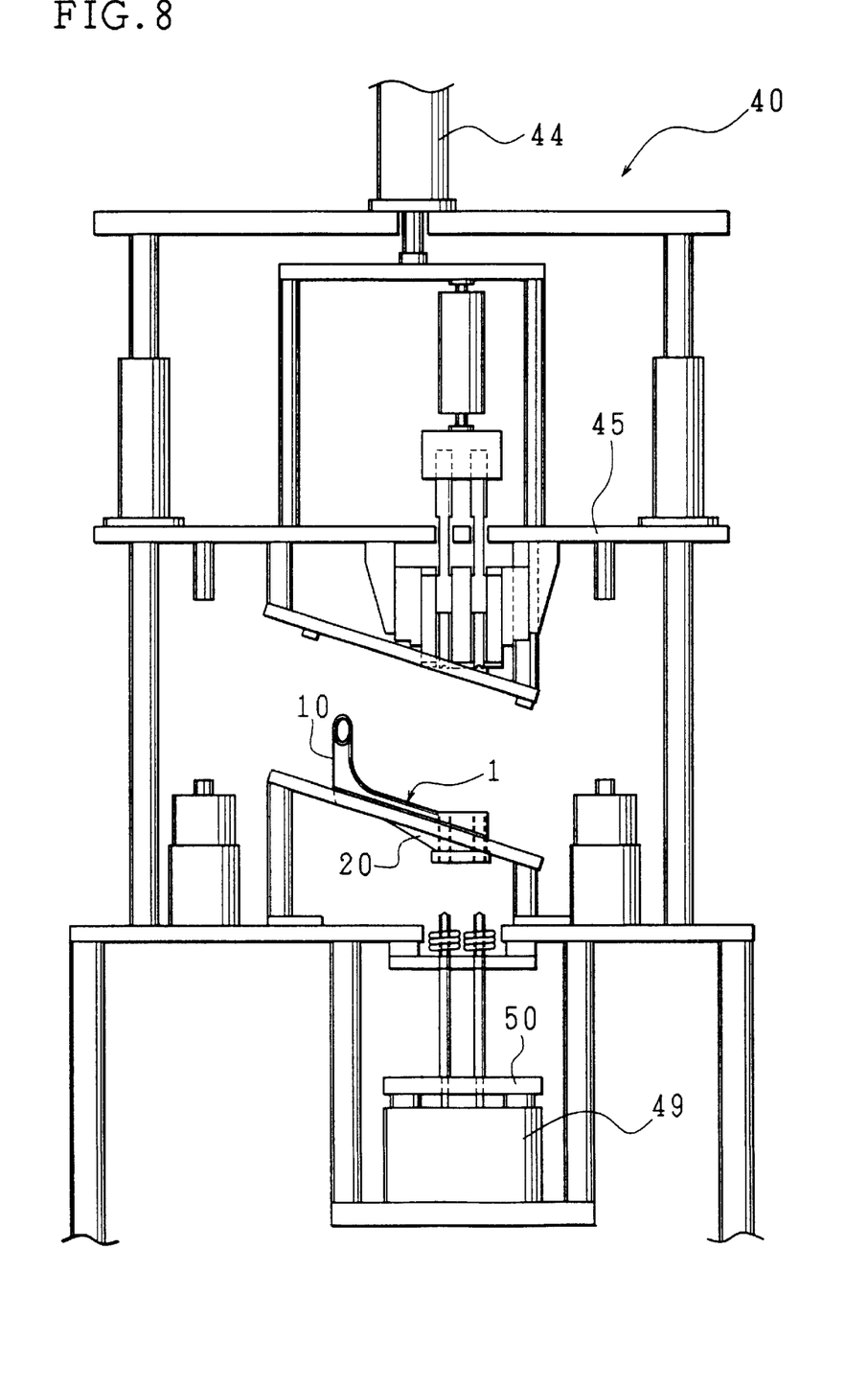
FIG. 8 is an explanatory drawing of a product removal step in a method of manufacturing an oil strainer, showing raising of an upper sliding table and lowering of pins for press fitting of the bushing by lowering a lower sliding table, thus allowing removal of the oil strainer.

Next, as shown in FIG. 8, the upper air cylinder 44 raises the upper sliding table 45, and the lower air cylinder 49 lowers the lower sliding table 50.

In this way, the oil strainer can now be removed from the welding device 40 as a final product.

Incidentally, the cycle time from immediately after setting the lower and upper partial bodies 10 and 20 in the welding device 40 to immediately before removal of the oil strainer as a final product is approximately 60 sec.

The following will explain a method of attaching the foregoing oil strainer to the engine 9.

Incidentally, the present embodiment explains an oil strainer for attachment to the bottom of the main body of the engine 9, but there is no limitation to this structure. It is also possible to connect the oil strainer directly to an oil pump (not shown) provided in the interior of the engine 9.

First, as shown in FIG. 3(a), an O-ring is placed in the O-ring groove 25 formed in the upper surface 23 encircling the oil outlet section 24, and the upper surface 23 is placed in contact with the engine 9. Next, the bolts 8 are passed through the tube-shaped bushing 7 and tightened. Here, bolts 8 may be used which have threads only at the ends. Further, the outer diameter of the bolt heads 8a may be equal to the outer diameter of the bushing 7.

Since the bolts 8 are supported by the metal bushing 7, it is possible to attain precision in dimensions of the installation members.

As discussed above, the oil strainer according to the present embodiment comprises the lower and upper partial bodies 10 and 20, made of synthetic resin, joined together to form the roughly tube-shaped strainer main body 1, the interior of which is provided with the filter 2.

Accordingly, oil flows in through the inlet opening 11a of the roughly tube-shaped strainer main body 1, is filtered by passing through the filter 2, and flows out of an oil outlet section 24 of the roughly tube-shaped strainer main body 1 and is supplied to the engine 9.

The oil strainer according to the present embodiment has a flange section 3 for attachment to the engine 9 with bolts 8, and the flange section 3 is provided with at least a bolt hole 5 which passes through the interior of the roughly tube-shaped strainer main body 1.

In other words, the bolt holes of the flange section were conventionally provided so as to project from the sides of the strainer main body, making it difficult to reduce the space devoted to installation members.

However, with the oil strainer according to the present embodiment, at least the bolt hole 5 of the flange section 3 is provided so as to pass through the roughly tube-shaped strainer main body 1.

Consequently, at least the bolt hole 5 does not project from the side of the strainer main body 1, thus contributing to reduction of the space devoted to installation members.

In other words, by providing the bolt hole 5 substantially on a line linking the oil inlet tube section 11 and the oil outlet section 24, the shape of the oil outlet section 24, including the flange section 3, can be made more compact.

Here, since the strainer main body 1 is roughly tube-shaped, the other bolt hole 4 can be provided, as in the present embodiment, in the flange section 3 at the end of the strainer main body 1, and since the bolt hole 4 is located along the line of the roughly tube-shaped strainer main body 1, it will not project from either side of the strainer main body 1.

Further, in the present embodiment, as mentioned above, at least the bolt hole 5 of the flange section 3 is provided so as to pass through the interior of the roughly tube-shaped strainer main body 1. This means that the thickness of the flange section 3 is not less than the width of the roughly tube-shaped strainer main body 1 in section.

Accordingly, whereas conventionally the flange section was thin, leading to resin fatigue due to vibration when the engine was running, the flange section 3 in the present embodiment is thicker, and the flange section 3 can be given a rigid structure, thus reducing resin fatigue due to vibration when the engine is running.

Incidentally, in the present embodiment, the thickness of the flange section 3, i.e. the length of the bushing 7, is, for example, approximately six times the thickness of a conventional flange section.

As a result, it is possible to provide an oil strainer which can be installed on a small installation surface, and which can reduce resin fatigue.

Further, in the oil strainer according to the present embodiment, metal bushing 7, for supporting and guiding the bolts 8, is inserted in and fixed to the bolt holes 4 and 5.

Consequently, when the oil strainer is attached to the engine 9, the bolts 8 are guided by the bushing 7, and, since the bolts 8 do not directly touch the synthetic resin, but only the metal bushing 7, the metal bushing 7 also supports the bolts 8. Further, the metal bushing 7 are inserted into and fixed to the bolt holes 4 and 5 of the synthetic resin.

Accordingly, even if the synthetic resin changes over time, the bolt holes 4 and 5 are securely fixed to the rough-finished sections 7a of the bushing (which are for example knurled), and thus the upper surface 23 of the flange section 3 is not influenced by change over time, and maintains its original flatness.

Further, when the bolts 8 are supported directly by the synthetic resin flange section 3, change over time causes reduction of the stress applied to the synthetic resin flange section 3 (stress relaxation), thus impairing the screw torque of the bolts 8. Consequently, vibration when the engine is running leads to loosening of the bolts 8, thus impairing the seal.

However, in the present embodiment, since the bolts 8 are supported by the metal bushing 7, it is possible to avoid both reduced torque due to stress relaxation of the synthetic resin and loosening of the bolts 8 due to vibration when the engine is running. Consequently, oil will not leak from the juncture between engine and oil strainer.

Accordingly, an oil strainer can be provided which can prevent impairment of the seal due to loosening of installation members.

Further, a method of manufacturing an oil strainer according to the present embodiment comprises the steps of: (a) forming the lower and upper partial bodies 10 and 20 by injection molding; (b) attaching the filter 2 in the interior of the upper partial body 20; (c) heating and melting the joint surfaces 10a and 20a of the lower and upper partial bodies 10 and 20; (d) bringing the lower and upper partial bodies 10 and 20 together and joining them to form a roughly tube-shaped shape; (e) a press fitting step, in which the metal bushing 7 for guiding the bolts 8 are heated and inserted under pressure into the bolt holes 4 and 5 of the flange section 3; and (f) a pressure fixing step, in which the strainer main body 1 is fixed to the bushing 7 under pressure such that the bushing 7 protrude from a surface of the bolt holes 4 and 5 of the flange section 3.

In other words, the lower and upper partial bodies 10 and 20 are first formed by injection molding. Then the filter 2 is attached to the interior of the upper partial body 20.

Next, the joint surfaces 10a and 20a of the lower and upper partial bodies 10 and 20 are heated and melted, and the lower and upper partial bodies 10 and 20 are brought together and joined to form a roughly tube-shaped shape.

Then, in the press fitting step, the bushing 7 for guiding the bolts 8 are heated and inserted under pressure into the bolt holes 4 and 5 of the flange section 3. Next, in the pressure fixing step, the strainer main body 1 is fixed to the bushing 7 under pressure such that the bushing 7 protrude from a surface of the bolt holes 4 and 5 of the flange section 3.

With regard to the final positional relationship between the bushing 7 and the bolt holes 4 and 5, in order to form a seal, it is preferable if the upper surface 23 of the flange section 3 facing the engine 9 is on the same plane with the ends of the bushing 7. On the lower surface 13 of the flange section 3 facing away from the engine 9, on the other hand, the ends of the bushing 7 are on the same plane with the lower surface 13, or protrude beyond it. This is to ensure that the bushing 7 fully support the bolts 8.

Further, since a pressure fixing step is used, fixing between the bushing 7 (provided with the rough-finished sections 7a which are knurled, for example) and the bolt holes 4 and 5 is particularly good, and the seal will not be impaired even if the synthetic resin changes over time.

As a result, it is possible to provide a method of manufacturing an oil strainer which can be installed on a small installation surface, which is able to reduce resin fatigue, and which can prevent impairment of the seal due to loosening of installation members.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. An oil strainer comprising two synthetic resin partial bodies, joined together to form a tubular main body, the interior of which is provided with a filter; and a mounting flange section, wherein:

said flange section is provided with a first bolt hole which passes through the interior of said tubular main body, and the main body has a longitudinal axis with an end along the longitudinal axis, and a second bolt hole is provided at said end of the main body.

2. The oil strainer set forth in claim 1, wherein:

a metal guide tube for guiding and supporting a bolt in sad first bolt hole is inserted and fixed in said first bolt hole of said flange section.

3. The oil strainer set forth in claim 1, further comprising an oil section, an oil outlet section and the longitudinal axis therebetween, said first bolt hole being positioned to pass through the interior of the main tubular body near the longitudinal axis.

4. An oil strainer, comprising:

upper and lower synthetic resin partial bodies, joined together along a plane to form a tubular main body;

a generally planar filter, located between the upper and lower partial bodies, said filter extending generally parallel to said plane and dividing an interior of the tubular main body into a lower inlet section and an upper outlet section; and a mounting flange section, provided with at least one bolt hole which passes through the interior of said tubular main body.

5. The oil strainer set forth in claim 4, wherein:

a metal guide tube for guiding and supporting a bolt in said at least one bolt hole is inserted and fixed in said at least one bolt hole of said flange section.

6. An oil strainer, comprising:

upper and lower synthetic resin partial bodies, joined together along a plane to form a tubular main body;

a generally planar filter, located between the upper and lower partial bodies, said filter extending generally parallel to said plane and dividing an interior of the tubular main body into a lower inlet section and an upper outlet section;

a planar mounting flange section on the upper partial body;

an outlet opening extending through the mounting flange section adjacent the upper outlet section; and an inlet opening extending through the lower partial body adjacent the lower inlet section, wherein said flange section of the upper partial body and the lower partial body each include at least one tubular portion extending through the interior of said tubular main body for defining a respective bolt hole which passes through the flange section, the lower partial body, said filter, and the interior of said tubular main body.

7. The oil strainer set forth in claim 6, wherein:

a metal guide tube for guiding and supporting a bolt in said at least one bolt hole is inserted and fixed in said at least one bolt hole of said flange section.

* * * * *